United States Patent [19]
Parsons, III

[11] Patent Number: 5,655,330
[45] Date of Patent: Aug. 12, 1997

[54] SLAB PATTERN TOOL FOR TERMITE TREATMENT DRILLING

[76] Inventor: Henry S. Parsons, III, 1102 Chandler Haulk Rd., Loganville, Ga. 30249

[21] Appl. No.: 548,007

[22] Filed: Oct. 25, 1995

[51] Int. Cl.$^6$ ................................................. A01M 17/00
[52] U.S. Cl. .................. 43/124; 43/132.1; 33/562; 52/105
[58] Field of Search .................... 43/124, 132.1; 52/741.3, 742.16, 169.11, 169.5, 105; 33/562, 613, 644, 645, 758, 759

[56] References Cited

U.S. PATENT DOCUMENTS

| | | | |
|---|---|---|---|
| 2,575,077 | 11/1951 | Snyder | 33/759 |
| 2,915,848 | 12/1959 | Griffin | 43/124 |
| 2,981,025 | 4/1961 | Woodson | 43/124 |
| 3,124,893 | 3/1964 | Glenn | 43/124 |
| 3,210,850 | 10/1965 | Grzyb | 33/758 |
| 3,602,248 | 8/1971 | Peacock . | |
| 3,676,949 | 7/1972 | Ramsey . | |
| 3,909,975 | 10/1975 | Basile | 43/124 |
| 3,940,875 | 3/1976 | Basile | 43/124 |
| 4,297,055 | 10/1981 | Peacock | 43/124 |
| 4,651,434 | 3/1987 | Haynes | 33/562 |
| 4,893,434 | 1/1990 | Knipp et al. . | |
| 5,012,590 | 5/1991 | Wagner et al. | 33/759 |
| 5,027,546 | 7/1991 | Tallon . | |
| 5,058,313 | 10/1991 | Tallon . | |
| 5,079,842 | 1/1992 | Ward | 33/562 |
| 5,107,601 | 4/1992 | Semchuck | 33/759 |
| 5,165,199 | 11/1992 | Tallon . | |
| 5,184,419 | 2/1993 | Tallon . | |
| 5,329,726 | 7/1994 | Thorne et al. . | |
| 5,347,749 | 9/1994 | Chitwood et al. . | |
| 5,378,086 | 1/1995 | Campbell, Jr. et al. | 43/124 |
| 5,394,642 | 3/1995 | Takaoka . | |

Primary Examiner—Joseph J. Hail, III
Assistant Examiner—Darren Ark
Attorney, Agent, or Firm—Hinkle & Associates, P.C.

[57] ABSTRACT

A slab pattern tool for termite treatment drilling in which the tool comprises a drill pattern (11) with a series of color coordinated drilling holes (12) wherein the colors represent different spacing patterns, and a set of adjustment footings (14) which abut the wall of the building being treated and allow for adjustment away from the foundation footing at the wall.

9 Claims, 2 Drawing Sheets

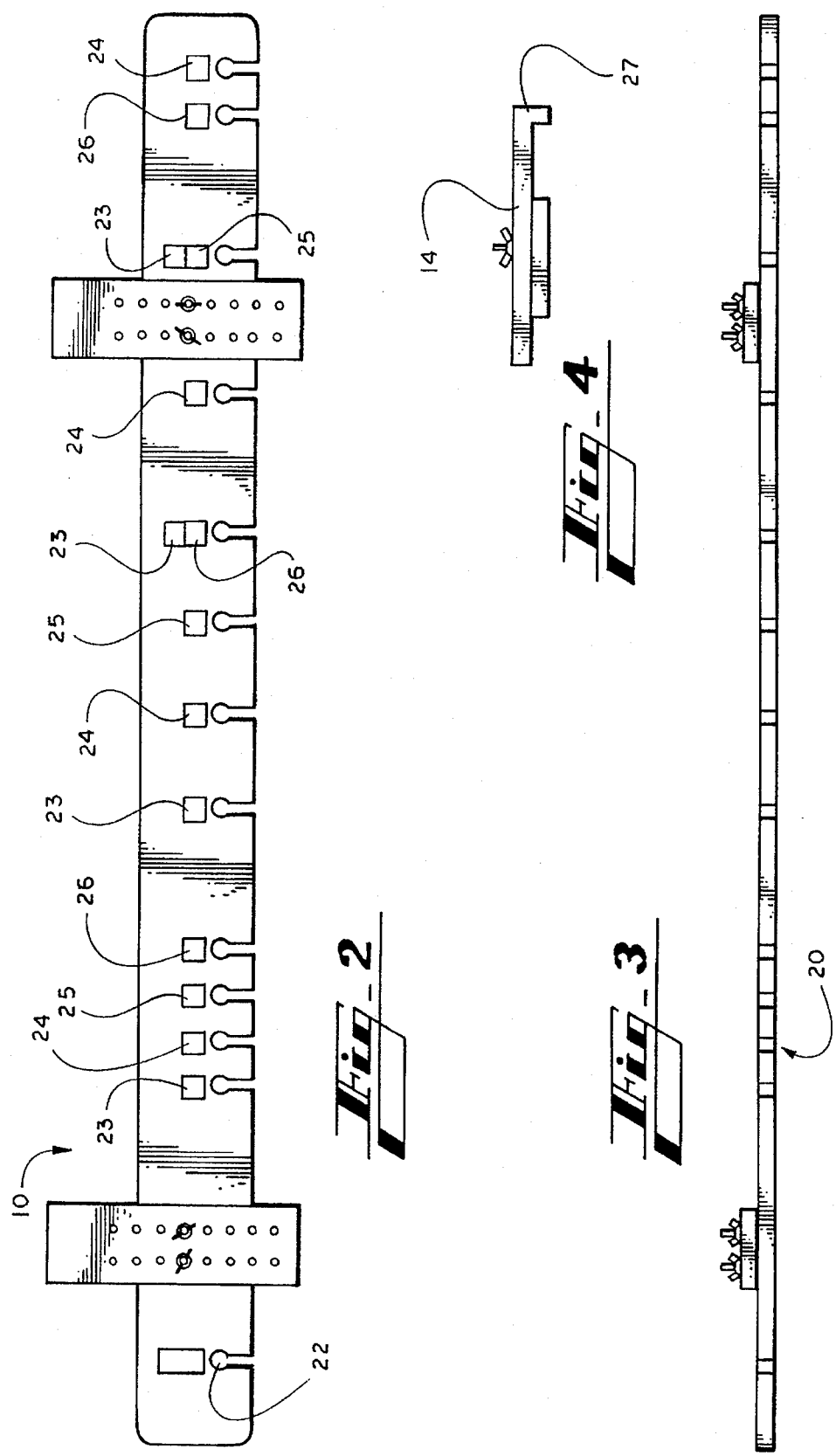

SLAB PATTERN TOOL FOR TERMITE TREATMENT DRILLING

BACKGROUND OF THE INVENTION

I. Field of the Invention

The present invention relates generally to tools used for the treatment of soil for termites, and relates particularly to a tool for accurately drilling holes in a concrete slab to provide access to the soil beneath the slab for termite treatment.

II. Description of the Prior Art

To control termites, the soil that surrounds the walls of a building is treated with termiticides. In areas of the building with concrete slabs abutting the walls, the concrete slabs require drilling for proper application of the termiticides. The goal of soil treatment is to create a barrier between the wood in the structure and the termite colonies in the soil. Improper application of the termiticides or improper drilling of the holes in the slab are common errors that can lead to untreated gaps in the barrier.

Application of termiticides to the land is regulated in some fashion at both the state and federal levels. At the state level agencies such as the Department of Agriculture may further regulate the pest control industry by regulating the companies that provide the termiticides treatment for the consumer. For example, the Georgia Department of Agriculture promulgates rules that apply to members of the pest control industry such as Rule 620-6-.04(1)(i) which requires "treatment of all grade level slabs contiguous to the structure with an approved termiticide at the rate of four (4) gallons per ten (10) linear feet by drilling and applying along the entire distance where slab joins any part of structure at intervals of no more than twelve (12) inches and no more than twelve (12) inches from the structure wall."

Besides state and federal regulations, there are other factors controlling the application of termiticides to the soil beneath concrete slabs. It is common to find backfill materials comprising sand, loam, or gravel under slab foundations. As a result, the proper drill hole spacing and proper amount of termiticide dilution to be injected into the holes depends on the type of fill below the slab, the amount of settling that has occurred, and the moisture content of the fill.

The slab pattern tool of the present invention simplifies the accurate and efficient drilling of concrete slabs by service technicians, and the slab pattern tool has heretofore not been known.

SUMMARY OF THE INVENTION

The slab pattern tool of the present invention comprises a drill pattern having a top surface and a slotted side. The drill pattern has a plurality of drilling holes that mark the point where the drill bit is supposed to enter the concrete. Also, the drill pattern has a plurality of drill bit removal slots that extend from the drilling holes to the slotted side of the drill pattern. The slab pattern tool further comprises at least two adjustment footings which adjustably connect to the drill pattern and abut the wall. The adjustment footings allow for adjustment of the slab pattern tool away from the wall from approximately five to twelve inches. The purpose of the adjustment is to allow the tool to be moved away from the foundation footing in small increments.

An object of the present invention is to provide uniform termite treatment drilling patterns that conform to all state and federal regulations.

Another object of the present invention is to provide uniform termite treatment drilling holes in a quick and efficient manner that reduces the possibility of human error.

Another object of the present invention is to prevent untreated gaps in the termiticide barrier by reducing the possibility of drilling errors.

Another object of the present invention is to provide a chalk line appearance to the termite treatment drilling holes which appeals to the consumer.

Other objects, advantages and capabilities of the invention will become apparent from the following description taken in conjunction with the accompanying drawings showing preferred embodiments of the invention.

BRIEF DESCRIPTION OF THE DRAWINGS

FIG. 2 is a plan view of the slab pattern tool of the present invention;

FIG. 3 is a side elevation view of the slab pattern tool of the present invention; and FIG. 4 is an end view of the slab pattern tool showing the adjustment footing in an extended position.

DESCRIPTION OF THE PREFERRED EMBODIMENTS

Figure 1:
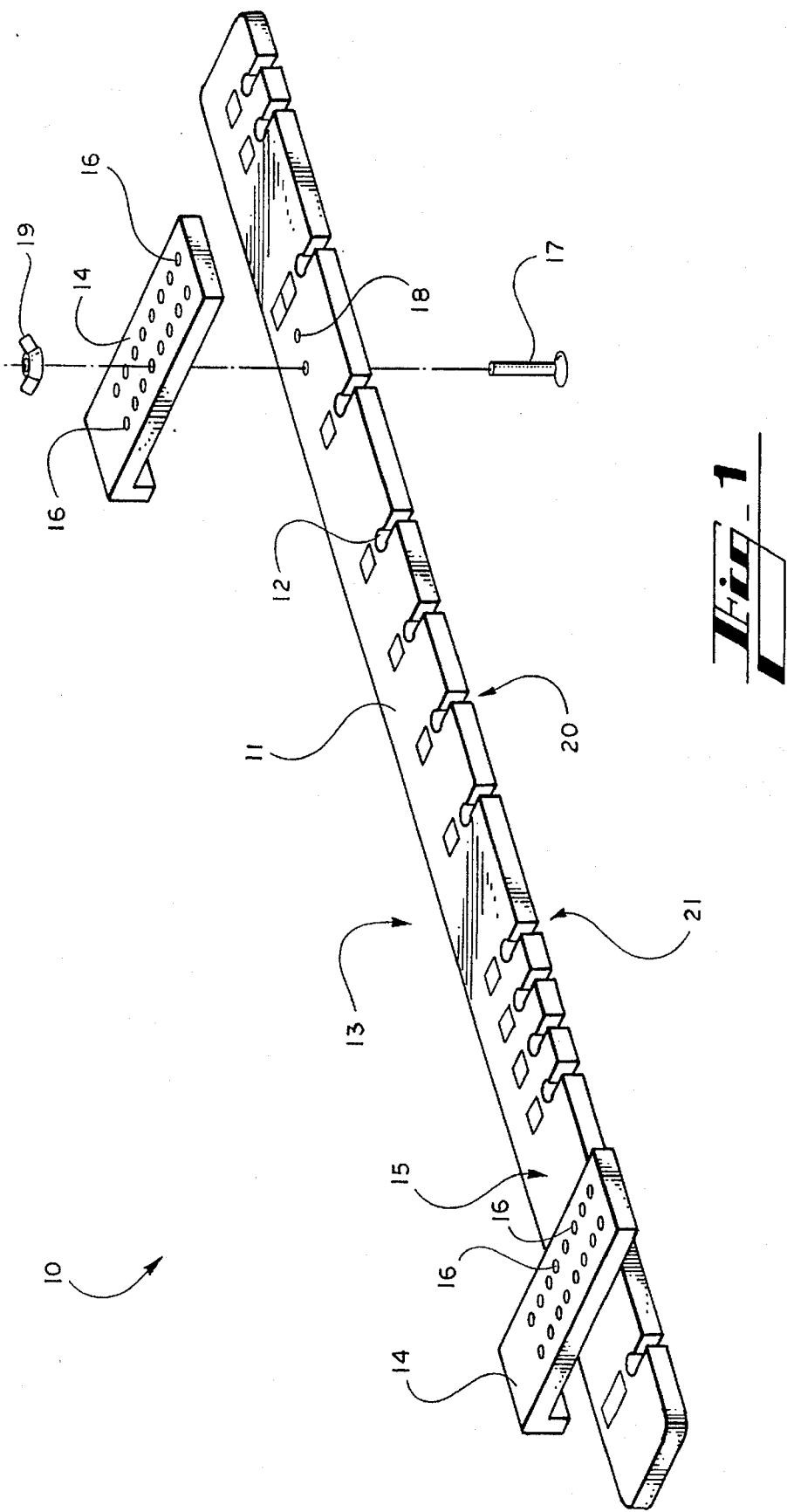
FIG. 1 is a perspective view of the slab pattern tool of the present invention.

Referring to the drawings wherein like reference numerals designate corresponding parts throughout the several figures, and initially referring to FIG. 1, the slab pattern tool 10 of the present invention comprises a drill pattern 11 that has a series of drilling holes 12 that form a guide for the drilling of a concrete slab. The drill pattern 11 is used for drilling concrete for subterranean termite treatments in concrete slabs that are contiguous to the walls of a building. The drilling holes 12 are preferably three-quarter inch (¾") in diameter and centered at a point three and five-eighths (3⅝") from the wall side 13 of the slab pattern. The adjustment footings 14 attach to a top surface 15 of the drill pattern 11, and create an offset from the wall that the concrete slab joins. The adjustment footings 14 have a set of holes 16 that allow for adjustment from a position approximately five inches (5") from the wall to a position approximately twelve inches (12") from the wall. The adjustment footing 14 is attached to the drill pattern 11 by means of three-eighths inch (⅜") bolts 17 that go through the set of holes 16 in the adjustment footing 14 and through a set of corresponding holes 18 in the slab pattern 11. To change the distance of the slab pattern 11 from the wall, the bolts 17 are placed in a different set of the holes 16. The different holes on the adjustment footing are marked with distances ranging from five (5) to twelve (12) inches from the wall. The adjustment footings are attached to the slab pattern 11 by the bolts 17 and a set of wing nuts 19 that allow for easy adjustment of the footings 14 in the field.

The footing of the foundation of the house usually protrudes no more than four inches (4") from the wall of the building. The drilling for the application of termiticide should be done at a point just beyond the footing. The adjustment footing 14 provides a fine adjustment in one inch increments from a distance of four and five-eighths inches (4⅝") to eleven and five-eighths inches (11⅝") measured from the wall to the center of the drilling holes 12. This fine adjustment allows the service technician to move the slab pattern tool 10 away from the wall, if an initial drilling hits the footing of the foundation. The distance of five to twelve inches from the wall includes the width of a support leg 27 that is at the front of the adjustment footing 14 and makes contact with the wall. The support leg is preferably one (1") inch wide. Accordingly, at the first set of holes 16 in the adjustment footing 14, the distance from the wall to the center of the drilling hole 12 is equal to three and five-eighths inches from the center of the drilling hole to the wall side 13 of the drill pattern 11 plus one inch for the support leg 27.

The drilling holes 12 are open at one end to a drill bit removal slot 20 that goes all the way to the slotted side 21 of the drill pattern 11.

Referring to FIG. 2, a starting hole 22 is positioned on the left side of the slab pattern tool 10. The other drilling holes 12 are color coded and spaced from twelve to eighteen inches from the starting hole 22. A series of red labels 23 indicate a drilling hole pattern based on twelve inch centers. A series of blue labels 24 indicate a drilling hole pattern based on fourteen inch centers. Purple labels 25 indicate a drilling hole pattern based on sixteen inch centers, and yellow labels 26 indicate a drilling hole pattern based on eighteen inch centers. Once the starting hole has been drilled, a set stob or metal rod approximately one-hag inch diameter by three feet long should be placed in the hole through the slab pattern tool 10 to hold the tool in place while drilling the rest of the holes 12.

In FIG. 3, the slotted side 21 of the drill pattern 11 is shown with the drill bit removal slots 20 leading to each drilling hole 12. The drill bit removal slots 20 allow for some of the concrete dust generated from drilling to move away from the drilling hole. Also, If the drill bit breaks or becomes lodged in the concrete by hitting rock or rebar, the drill bit removal slots 20 allow the slab pattern tool 10 to be removed from around the drill. The slab pattern tool 10 should be removed by lifting the tool from the wall side 13 of the drill pattern 11 up and away from the drill.

FIG. 4 shows the adjustment footing 14 in an extended position. The support leg 27 is positioned against the wall when the slab pattern tool 10 is being used.

Various modifications may be made of the invention without departing from the scope thereof and it is desired, therefore, that only such limitations shall be placed thereon as are imposed by the prior art and which are set forth in the appended claims.

What is claimed is:

1. A slab pattern tool for termite treatment drilling, the slab pattern tool providing a guide for drilling a concrete slab that abuts a wall of a building, the slab pattern tool comprising:

a drill pattern having a wall side, a slotted side, and a top surface, the drill pattern having a plurality of drilling holes and having a plurality of drill bit removal slots, the drill bit removal slots extending from the drilling holes to the slotted side of the drill pattern, a plurality of color coordinated labels, the labels affixed to the top surface of the drill pattern and located adjacent to the drilling holes, the labels of each color representing a predetermined spacing pattern from a starting hole, and at least two adjustment footings, the adjustment footings adjustably connecting to the top surface of the drill pattern, extending from the wall side of the drill pattern, and abutting the wall.

2. The slab pattern tool as claimed in claim 1 further comprising:

the drill pattern having a set of adjustment footing mounting holes, each of the adjustment footings having a set of holes, and attachment means for attaching the adjustment footings to the drill pattern through the adjustment footing mounting holes and the holes in the drill pattern.

3. The slab pattern tool as claimed in claim 1 wherein the color coordinated labels further comprise, a label indicating a hole spacing pattern of twelve inches from the starting hole, a label indicating a hole spacing pattern of fourteen inches from the starting hole, a label indicating a hole spacing pattern of sixteen inches from the starting hole, and a label indicating a hole spacing pattern of eighteen inches from the starting hole.

4. The slab pattern tool as claimed in claim 1 further comprising a set stob, the set slob having a diameter smaller than a diameter of one of the drilling holes and having an oblong cylindrical shape.

5. A slab pattern tool for termite treatment drilling, the slab pattern tool providing a guide for drilling a concrete slab that abuts a wall of a building, the slab pattern tool comprising:

a drill pattern having a wall side, a slotted side, and a top surface, the drill pattern having a plurality of drilling holes and having a plurality of drill bit removal slots, the drill bit removal slots extending from the drilling holes to the slotted side of the drill pattern, the drill pattern having a set of adjustment footing holes, a plurality of color coordinated labels, the labels affixed to the top surface of the drill pattern and located adjacent to the drilling holes, the labels of each color representing a predetermined spacing pattern from a starting hole, at least two adjustment footings, the adjustment footings adjustably connecting to the top surface of the drill pattern, extending from the wall side of the drill pattern, and abutting the wall, the adjustment footings having a series of holes for adjusting the distance of the drill pattern from the wall, and quick adjusting attachment means for attaching the adjustment footings to the drill pattern through the holes in the attachment footing and the adjustment footing holes in the drill pattern.

6. The slab pattern tool as claimed in claim 5 wherein the adjustment footings further comprise a rectangular section and a support leg connected to the rectangular section.

7. The slab pattern tool as claimed in claim 5 further comprising a set stob, the set slob having a diameter smaller than a diameter of one of the drilling holes and having an oblong cylindrical shape.

8. A slab pattern tool for termite treatment drilling, the slab pattern tool providing a guide for drilling a concrete slab that abuts a wall of a building, the slab pattern tool comprising:

a drill pattern having a top surface and a slotted side, the drill pattern having a plurality of drilling holes, the drill pattern having a plurality of drill bit removal slots, the drill bit removal slots extending from the drilling holes to the slotted side of the drill pattern, the drill pattern having a set of adjustment footing mounting holes, at least two adjustment footings, the adjustment footings adjustably connecting to the top surface of the drill pattern and abutting the wall, and each of the adjustment footings having a set of holes, attachment means for attaching the adjustment footings to the drill pattern through the adjustment footing mounting holes and the holes in the drill pattern.

9. A slab pattern tool for termite treatment drilling, the slab pattern tool providing a guide for drilling a concrete slab that abuts a wall of a building, the slab pattern comprising:

a drill pattern having a top surface and a slotted side, the drill pattern having a plurality of drilling holes, the drill pattern having a plurality of drill bit removal slots, the drill bit removal slots extending from the drilling holes to the slotted side of the drill pattern, at least two adjustment footings, the adjustment footings adjustably connecting to the top surface of the drill pattern and abutting the wall, and a set stob, the set stob having a diameter smaller than a diameter of one of the drilling holes and having an oblong cylindrical shape.

* * * * *